W. H. DILLET.
TIRE RETAINING RING FOR CLENCHER RIMS.
APPLICATION FILED OCT. 13, 1919.
1,330,061. Patented Feb. 10, 1920.
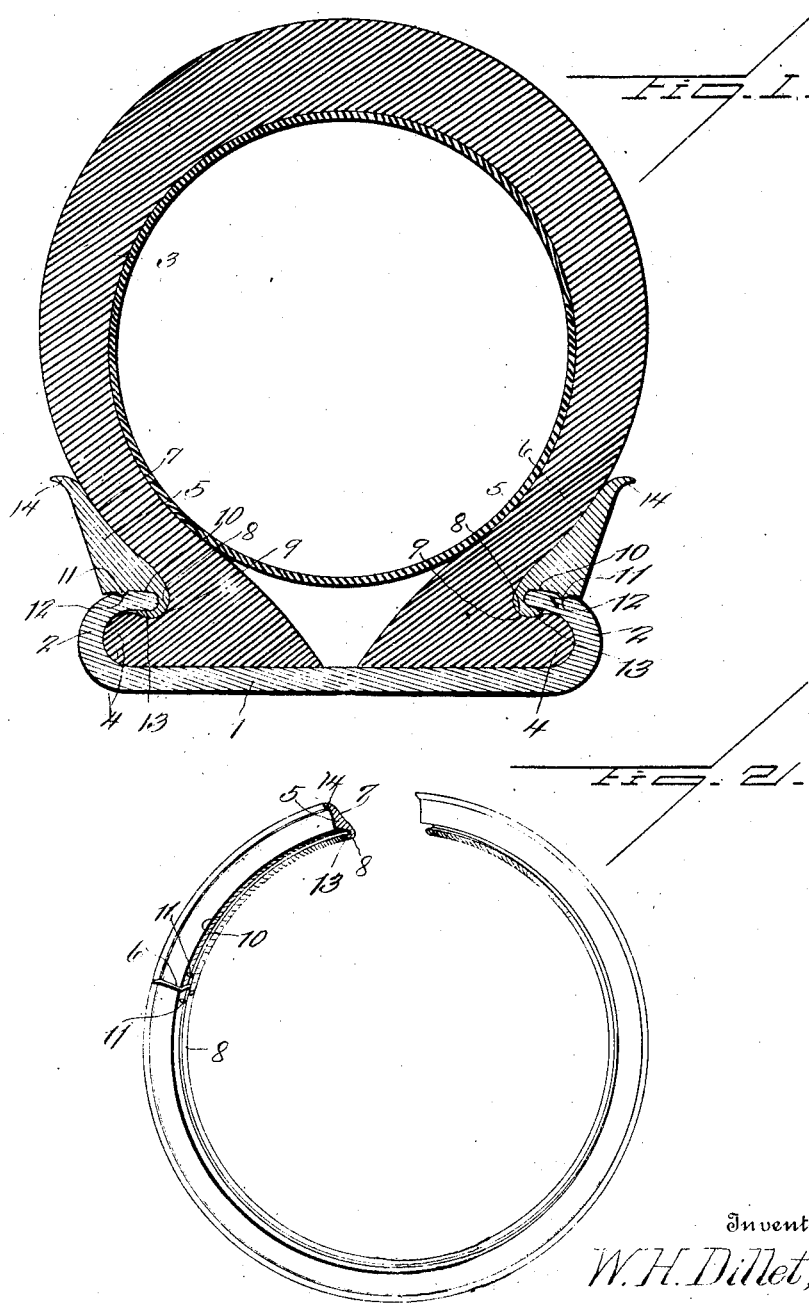

UNITED STATES PATENT OFFICE.

WILLIAM HENRY DILLET, OF RALSTON, OKLAHOMA.

TIRE-RETAINING RING FOR CLENCHER-RIMS.

1,330,061. Specification of Letters Patent. Patented Feb. 10, 1920.

Application filed October 13, 1919. Serial No. 330,429.

*To all whom it may concern:*

Be it known that I, WILLIAM H. DILLET, a citizen of the United States, residing at Ralston, in the county of Pawnee and State of Oklahoma, have invented certain new and useful Improvements in Tire-Retaining Rings for Clencher-Rims, of which the following is a specification, reference being had to the accompanying drawings.

This invention relates to an improved tire retaining ring for clencher rims, and an object of the invention consists in the provision of a ring, which is simple, efficient and practical in construction, and capable of being manufactured for a relatively low cost and sold at a reasonable profit.

Heretofore, in connection with rims having clencher flanges for the tire, it has been found that where the clencher flanges of the tire engage the clencher flanges of the rim, the tire becomes cut to such an extent that the interengagement of the clencher flanges of the rim and the tire becomes less secure, not only allowing the tire to become unseated adjacent the clencher flanges, but also causes a looseness of play between the rim and the tire, and furthermore, so damaging the tire as to shorten its life.

Therefore, another object of the invention is to provide a retaining ring for use in connection with the tire, particularly at the junction of the clencher flanges of the tire and the rim, and provided with means such as a bead or rounded portion, to engage the clencher flange of the tire, and to avoid what is called "rim cuts". By preventing rim cuts, the life of the tire will not be shortened, and furthermore, the clencher flanges of the tire and the rim will remain in secure and substantial engagement at all times, preventing the tire from unseating or disengaging the rim intermittently.

A further object of the invention is the provision of a retaining ring of this character, which is elongated or enlarged in cross-section, so as to provide abutment means for the side of the tire to hold the tire substantially in place, there being a secure engagement between the retaining ring and the clencher flange, to reinforce the retaining ring in position.

Still another object of the invention is the provision of a retaining ring constructed of any suitable metal, such as rolled steel, though not necessarily, and which is resilient enough to permit the retaining ring to be slipped over and in engagement with the clencher flange of the rim, in combination with means such as a lug adjacent the split ends of the retaining ring, to engage depressions formed in the clencher flange of the rim, not only to prevent outward movement of the retaining ring, but also to prevent slipping of the ring relatively to the clencher flange.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts as will be hereinafter set forth, shown in the drawings and claimed.

In the drawings:

Figure 1 is an enlarged cross-sectional view through a portion of a rim and a tire, showing the application of the latter, and illustrating the improved retaining ring applied at the junction of the interengagement of the clencher flanges of the rim and the tire.

Fig. 2 is an enlarged detail view of the retaining ring detached, showing a portion of the ring broken away, and the ends of the broken parts shown in section, so as to illustrate the shape of the ring in cross-section.

Referring more especially to the drawings, 1 designates a conventional form of rim, which is provided with the usual clencher flanges 2, and 3 denotes a tire, which may be any suitable construction or configuration, preferably such as that shown, though not necessarily, and which is provided with the clencher flanges 4. The clencher flanges 4 engage the clencher flanges 2 of the rim, the latter being split (not shown), and in the usual manner, so that it can be contracted and sprung in engagement with the tire.

Retaining rings 5 are provided, which are also split, as indicated at 6 and which are designed to be substantially of the shape shown in cross-section, though not necessarily, and are designed to act as abutments for the side of the tire as at 7, to prevent excessive outward movement of the side walls of the tire. In order that each retaining ring may act as an abutment, it is the aim to construct it elongated in cross-section, in other words, the shape as shown, so as to extend along and fit the outer surface of the tire as at 7. Each retaining ring is provided with a rounded portion or annular bead 8, which engages the channel or groove 9 adjacent the clencher flange 4 of the tire, to retain the tire in place and to avoid "rim cuts". Obviously, the prevention of rim cuts prolongs the life of the tire, and furthermore, the tire is prevented from receding or unseating from the rim, as the wheel is in action. Each retaining ring has an annular recess 10, preferably angular in cross-section, though not necessarily, to be engaged by the clencher flange 2 of the rim, so as to prevent outward movement of the retaining ring. It is to be noted that the retaining ring owing to its being constructed from rolled steel and since it is split as at 6 may be sprung over the clencher flange 2, so that the clencher flange 2 may engage the annular recess 10. Owing to the retaining ring tending to contract, it remains securely in engagement with the clencher flange 2, when once in place. Lugs 11 are formed upon certain of the walls of the angular recess 10 adjacent the split ends of the retaining ring, and are designed to engage correspondingly shaped depressions 12 of the clencher flange 2, thereby preventing creeping or slipping of the retaining ring annularly about the clencher flange, as well as preventing lateral disengagement of the retaining ring.

The rounded portion or annular bead 8 merges into an extension flange 13 which underlaps the clencher flange 2 of the rim, thereby assisting materially in holding the retaining ring in position. The retaining ring is provided with annular lip 14 which curves laterally, so that should the tire be partially deflated and the tire depressed, the tire will bulge outwardly in contact with the lip, owing to the formation of the lip, that is to say being curved as shown, the tire will not be injured, when it is bulged laterally. The flange 13 though it is shown as engaging under the clencher rim 2, does not completely contact with the under surface of the clencher rim 2, therefore it is possible to spring the retaining spring over the clencher flange 2. A looseness of play or a space is shown between the outer part of the retaining ring where it rests on the clencher flange 2, and said clencher flange which materially assists in permitting the retaining ring to be sprung over the clencher flange 2. The underlying flange 13, if desired, can be made somewhat smaller, or not quite so wide, so as to permit the retaining ring to more easily spring over and in engagement with the clencher flange 2.

The invention having been set forth, what is claimed as new and useful is:

1. The combination with a rim and tire having interengaging clencher flanges, of a retaining ring elongated in cross-section and constructed of yieldable or spring metal and adapted to be sprung into engagement with the clencher flange of the rim, thereby constituting an abutment for the tire, said retaining ring having an annular bead rounded in cross-section adapted to engage the channel between the tire and its clencher flange, thereby preventing rim cuts and interengaging means between the ring and the clencher flange of the rim to prevent creeping of the ring.

2. The combination with a rim and a tire having interengaging clencher flanges, of a retaining ring elongated in cross-section and acting as an abutment for the side of the tire, said retaining ring having an annular recess angular in cross-section to engage the clencher flange of the rim, said ring being split whereby it may be sprung over the clencher flange of the rim, one of the walls of the angular recess adjacent the split ends of the ring having means penetrating into the clencher flange of the rim to assist in retaining the ring in position, said ring having an annular bead rounded in cross-section and adapted to engage a channel between the tire and its clencher flange, thereby preventing rim cuts.

3. The combination with a rim and tire having interengaging clencher flanges, of a retaining ring elongated in cross-section and constructed of yieldable or spring metal and adapted to be sprung into engagement with the clencher flange of the rim, thereby constituting an abutment for the tire, said retaining ring having an annular bead rounded in cross-section adapted to engage the channel between the tire and its clencher flange, thereby preventing rim cuts and interengaging means between the ring and the clencher flange of the rim to prevent creeping of the ring, said annular bead having an extension flange underlying the clencher flange of the rim, thereby more securely holding the retaining ring in engagement with the clencher flange of the rim.

In testimony whereof I hereunto affix my signature.

WILLIAM HENRY DILLET.